(12) United States Patent
Mizutani et al.

(10) Patent No.: US 12,450,573 B2
(45) Date of Patent: Oct. 21, 2025

(54) INFORMATION PROCESSING APPARATUS

(71) Applicant: TOYOTA JIDOSHA KABUSHIKI KAISHA, Toyota (JP)

(72) Inventors: Wataru Mizutani, Miyoshi (JP); Kyosuke Matsumoto, Miyoshi (JP); Yohei Nakanishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/429,424

(22) Filed: Feb. 1, 2024

(65) Prior Publication Data
US 2024/0281772 A1 Aug. 22, 2024

(30) Foreign Application Priority Data
Feb. 22, 2023 (JP) .................................. 2023-026603

(51) Int. Cl.
*G06Q 10/20* (2023.01)
*G06F 16/245* (2019.01)
*G06Q 30/0283* (2023.01)

(52) U.S. Cl.
CPC ......... *G06Q 10/20* (2013.01); *G06Q 30/0283* (2013.01)

(58) Field of Classification Search
CPC ............... G06Q 10/20; G06Q 30/0283; G06Q 30/0621; G06F 16/245
See application file for complete search history.

(56) References Cited

U.S. PATENT DOCUMENTS

| | | | | |
|---|---|---|---|---|
| 7,502,672 | B1* | 3/2009 | Kolls ..................... | G06Q 30/06 340/988 |
| 2006/0064393 | A1* | 3/2006 | Orr ......................... | G06Q 10/10 705/400 |
| 2012/0299476 | A1* | 11/2012 | Roberts ................. | B60Q 1/2603 315/77 |
| 2016/0078403 | A1* | 3/2016 | Sethi ................... | G06Q 10/0875 705/26.81 |
| 2018/0025391 | A1* | 1/2018 | Funkhouser ........ | G06Q 30/0631 705/26.4 |
| 2020/0065885 | A1* | 2/2020 | Smith ................. | G06Q 30/0278 |

(Continued)

FOREIGN PATENT DOCUMENTS

| | | | |
|---|---|---|---|
| JP | 2002015178 | A | 1/2002 |
| JP | 2022183987 | A | 12/2022 |

OTHER PUBLICATIONS

Jacyna, M., & Semenov, I. (2020). Models of vehicle service system supply under information uncertainty. Eksploatacja i Niezawodność, 22(4), 694-704. (Year: 2020).*

(Continued)

*Primary Examiner* — John S. Wasaff
*Assistant Examiner* — Carlos F. Montalvo
(74) *Attorney, Agent, or Firm* — KENJA IP LAW PC

(57) ABSTRACT

An information processing apparatus includes a controller configured to acquire an identifier of a vehicle upon receiving a request for customization of the vehicle, identify one or more parts with which the vehicle is already equipped by searching a vehicle database that stores data on parts with which a plurality of vehicles is equipped using the acquired identifier as a key, and determine a work item for the customization according to the one or more identified parts.

7 Claims, 5 Drawing Sheets

(56) References Cited

U.S. PATENT DOCUMENTS

| | | | |
|---|---|---|---|
| 2021/0301992 A1* | 9/2021 | Jaranson | G09F 21/048 |
| 2022/0222984 A1* | 7/2022 | Singh | G07C 5/006 |
| 2022/0382738 A1 | 12/2022 | Ii et al. | |
| 2023/0115084 A1* | 4/2023 | Byers | G06Q 10/20 |
| | | | 705/4 |

OTHER PUBLICATIONS

Elger, Gordon, et al. "High power LED subassemblies for automotive front light application." 2012 IEEE 62nd Electronic Components and Technology Conference. IEEE, 2012. (Year: 2012).*

* cited by examiner

| VEHICLE ID | PART ID | EQUIPMENT START DATE | EQUIPMENT END DATE | ... |
|---|---|---|---|---|
| V1 | P1 | ... | ... | ... |
|  | P2 | ... | ... | ... |
|  | P3 | ... | ... | ... |
|  | ⋮ | ⋮ | ⋮ | ... |
| V2 | P1 | ... | ... | ... |
|  | P2 | ... | ... | ... |
|  | ⋮ | ⋮ | ⋮ | ... |
| ⋮ | ⋮ | ⋮ | ⋮ | ... |

| WORK ITEM ID | FEE | ... |
|---|---|---|
| C1 | ... | ... |
| C2 | ... | ... |
| C3 | ... | ... |
| ⋮ | ⋮ | ... |

| LOCATION ID | WORK ITEM ID | ADDRESS | ... |
|---|---|---|---|
| L1 | C1 | ... | ... |
|  | C2 |  |  |
|  | C3 |  |  |
|  | ⋮ |  |  |
| L2 | C1 | ... | ... |
|  | C2 |  |  |
|  | ⋮ |  |  |
| ⋮ | ⋮ | ⋮ | ... |

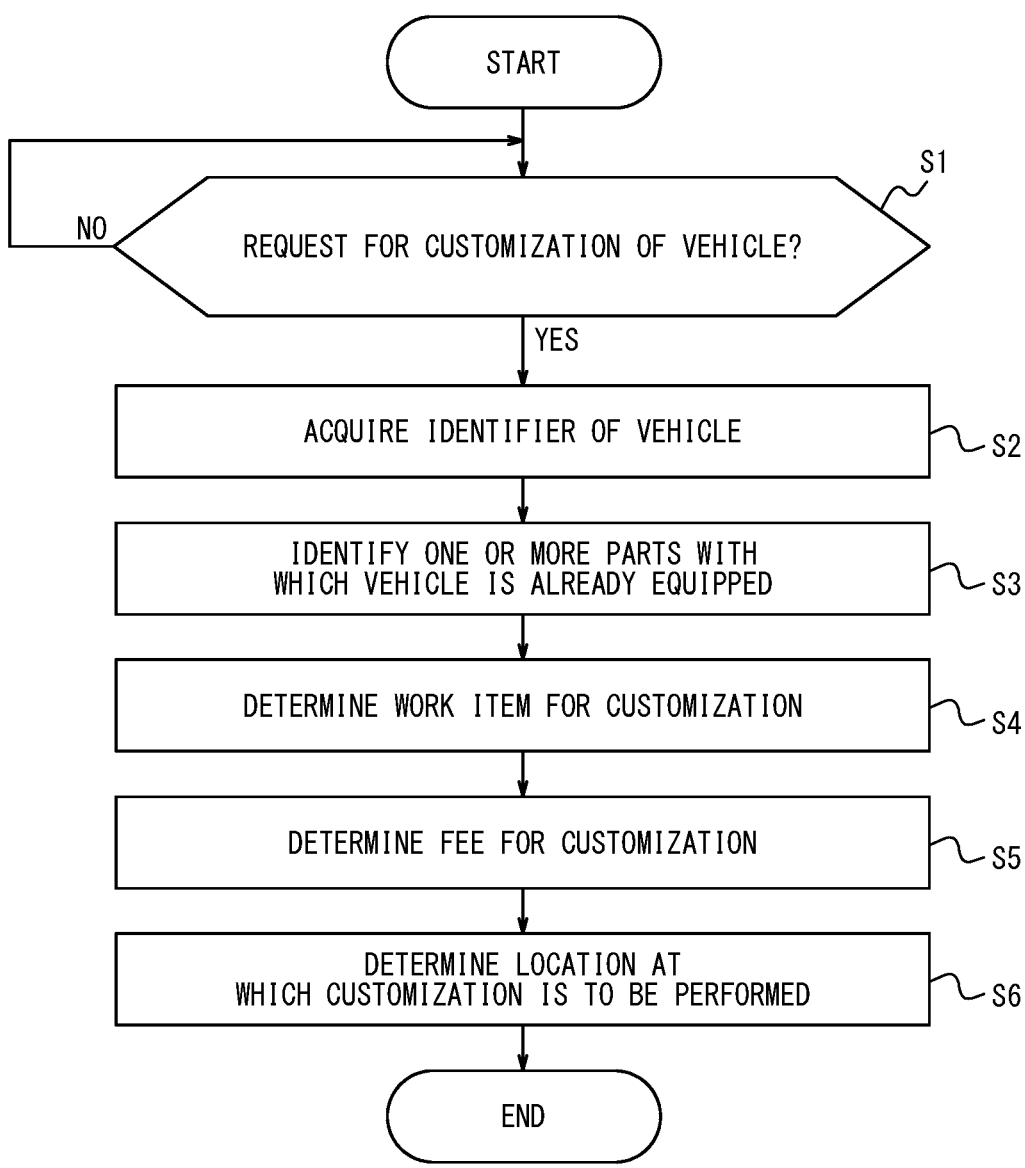

INFORMATION PROCESSING APPARATUS

CROSS-REFERENCE TO RELATED APPLICATION

This application claims priority to Japanese Patent Application No. 2023-026603 filed on Feb. 22, 2023, the entire contents of which are incorporated herein by reference.

TECHNICAL FIELD

The present disclosure relates to an information processing apparatus.

BACKGROUND

Patent Literature (PTL) 1 discloses a system for users to order goods via a network.

CITATION LIST

Patent Literature

PTL 1: JP 2002-015178 A
PTL 2: JP 2022-183987 A

SUMMARY

When an order of parts for customizing a vehicle is received from a user, the work items for customization may differ depending on the parts with which the vehicle is already equipped. In such a case, it is desirable to be able to determine a work item for customization without actually checking the vehicle.

It would be helpful to determine a work item for customization of a vehicle without actually checking the vehicle.

An information processing apparatus according to the present disclosure includes a controller configured to:
acquire an identifier of a vehicle upon receiving a request for customization of the vehicle;
identify one or more parts with which the vehicle is already equipped by searching a vehicle database that stores data on parts with which a plurality of vehicles is equipped using the acquired identifier as a key; and
determine a work item for the customization according to the one or more identified parts.

According to the present disclosure, a work item for customization of a vehicle can be determined without actually checking the vehicle.

BRIEF DESCRIPTION OF THE DRAWINGS

In the accompanying drawings:
FIG. 3 is a table illustrating an example of data stored in a vehicle database according to the embodiment of the present disclosure;
FIG. 4 is a table illustrating an example of data stored in a work item database according to the embodiment of the present disclosure;
FIG. 5 is a table illustrating an example of data stored in a location database according to the embodiment of the present disclosure;
and
FIG. 6 is a flowchart illustrating operations of an information processing apparatus according to the embodiment of the present disclosure.

DETAILED DESCRIPTION

Figure 1:
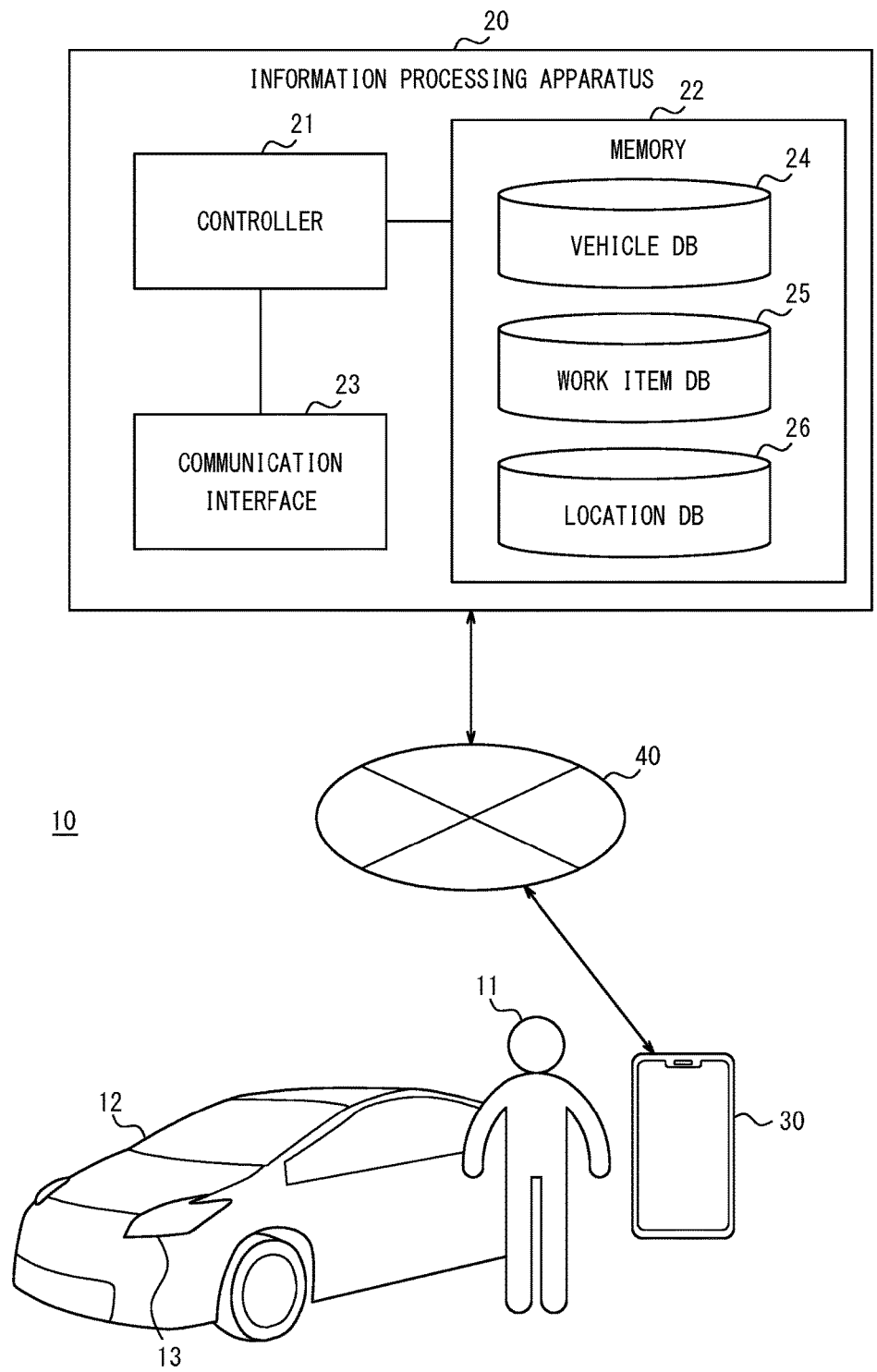
FIG. 1 is a diagram illustrating a configuration of an order processing system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of an order processing system 10 according to the present embodiment will be described with reference to FIG. 1.

The order processing system 10 includes an information processing apparatus 20 and a terminal apparatus 30. The information processing apparatus 20 can communicate with the terminal apparatus 30 via a network 40.

The information processing apparatus 20 is a computer installed in a facility such as a data center. The information processing apparatus 20 is, for example, a server that belongs to a crowd computing system or another computing system. The information processing apparatus 20 is operated by a business entity, such as an automobile dealer, that sells vehicle parts and provides vehicle maintenance or vehicle customization services.

The terminal apparatus 30 is a mobile device owned by a user 11 such as a mobile phone, a smartphone, or a tablet. Alternatively, the terminal apparatus 30 may be a general purpose device, such as a PC, located at the user 11's home or elsewhere. The term "PC" is an abbreviation of personal computer.

The network 40 includes the Internet, at least one WAN, at least one MAN, or any combination thereof. The term "WAN" is an abbreviation of wide area network. The term "MAN" is an abbreviation of metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

The terminal apparatus 30 requests the customization of the vehicle 12 to the information processing apparatus 20 via the network 40 in response to an operation by the user 11. When the information processing apparatus 20 receives a request for customization, it acquires the identifier of the vehicle 12. Using the acquired identifier as a key, the information processing apparatus 20 identifies one or more parts with which the vehicle 12 is already equipped by searching a vehicle database 24 that stores data on parts with which a plurality of vehicles is equipped. The "parts with which a plurality of vehicles is equipped" herein are not limited to hardware such as exterior or interior parts of each vehicle, but may also include software for implementing various functions such as driving and safety functions of each vehicle. The information processing apparatus 20 determines the work items for customization according to the one or more identified parts. Therefore, according to the present embodiment, it is possible to determine the work items for customization of the vehicle 12 without actually checking the vehicle 12. For example, when the information processing apparatus 20 receives an order of parts for customization of the vehicle 12 from the user 11, it can automatically determine the work items for customization without actually checking the vehicle 12, even if the work items for customization differ depending on the parts already installed.

In the present embodiment, the information processing apparatus 20 searches a work item database 25 that stores data on fees for a plurality of work items to further determine a fee for the customization. Thus, according to the present embodiment, the fee for customization of the vehicle 12 can also be determined without actually checking the vehicle 12. For example, when the information processing apparatus 20 automatically determines the work items for customization, it can also automatically calculate the fee of customization without actually checking the vehicle 12.

In the present embodiment, the information processing apparatus 20 searches a location database 26 that stores data on work items that can be performed at a plurality of locations to further determine the location where the customization is to be performed. Therefore, according to the present embodiment, it is possible to determine where to perform the customization of the vehicle 12 without having to check with each location. For example, when the information processing apparatus 20 automatically determines the work items for customization, it can automatically select the locations where customization can be performed without having to check with each location, even if the locations where customization can be performed are limited according to the work items.

The vehicle 12 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 12 may be a MaaS-dedicated vehicle. The term "MaaS" is an abbreviation of Mobility as a Service.

Figure 2:
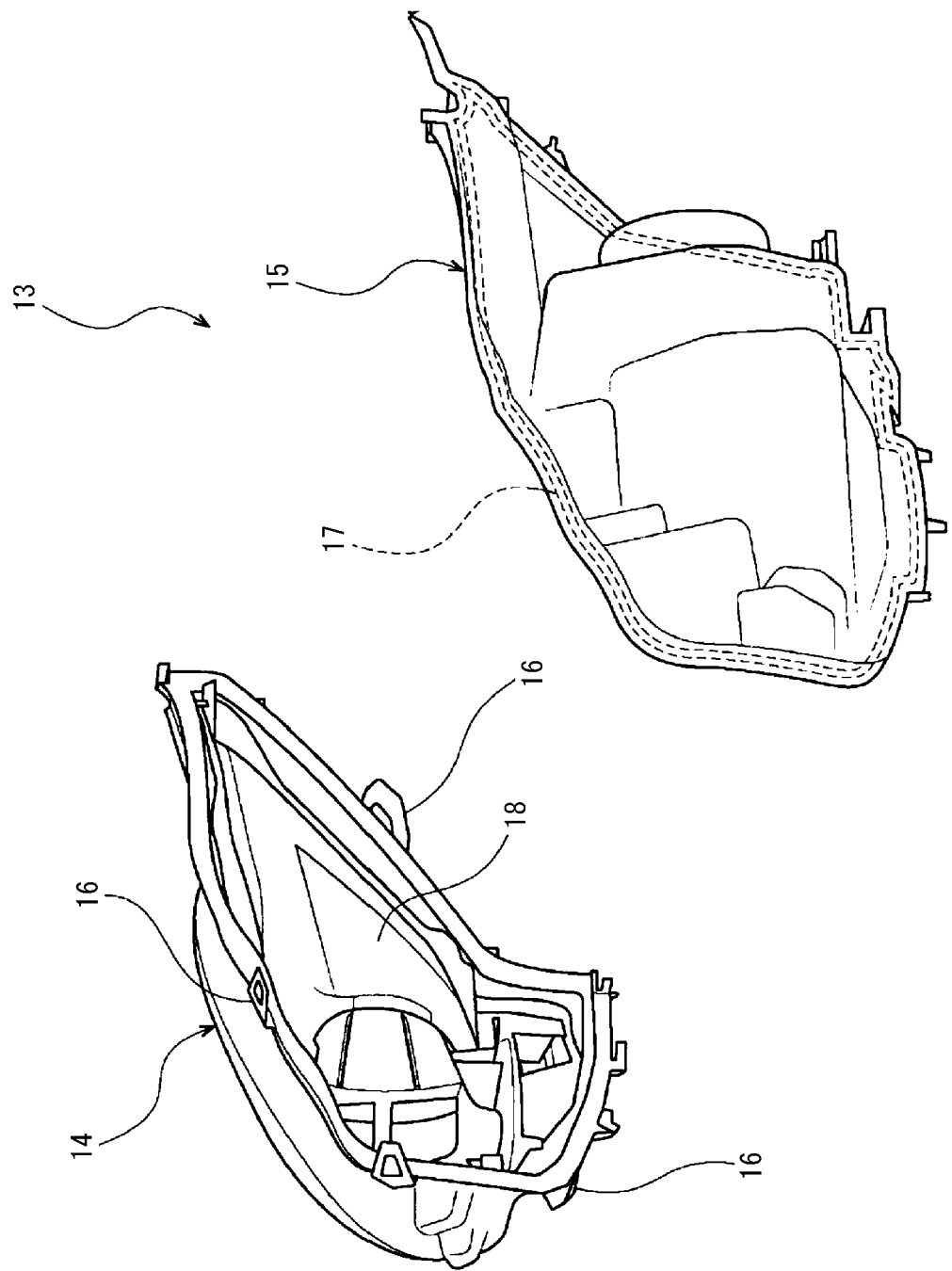
FIG. 2 is an exploded perspective view of a headlamp according to the embodiment of the present disclosure.

An example of a part with which the vehicle 12 is already equipped is a headlamp 13. As illustrated in FIG. 2, the headlamp 13 has, for example, an outer lens 14 and a housing 15.

The outer lens 14 bulges toward the front of the vehicle. The outer lens 14 is open at the rear of the vehicle. The outer lens 14 has a plurality of claws 16. The plurality of claws 16 are formed along the opening edges of the outer lens 14.

The housing 15 bulges toward the rear of the vehicle. The housing 15 is open on the front side of the vehicle. The outer lens 14 is attached to the housing 15 by the plurality of claws 16 hooked to corresponding points on the opening edge of the housing 15. A gasket 17 as a sealant is placed at the opening edge of the housing 15. The gasket 17 seals the gap between the outer lens 14 and the housing 15.

An extension 18 as a decorative member is attached to the inner surface of the outer lens 14. The extension 18 is configured to be visible from the outside of the headlamp 13. The design of the headlamp 13 can be changed by adding an extension 18 or changing an extension 18 to a different shape or a different color.

A configuration of the information processing apparatus 20 according to the present embodiment will be described with reference to FIG. 1.

The information processing apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the information processing apparatus 20 while controlling components of the information processing apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used in the operations of the information processing apparatus 20 and data obtained by the operations of the information processing apparatus 20.

The communication interface 23 includes at least one communication module. The communication module is, for example, a module compatible with a wired LAN communication standard such as Ethernet® (Ethernet is a registered trademark in Japan, other countries, or both) or a wireless LAN communication standard such as IEEE802.11. The name "IEEE" is an abbreviation of Institute of Electrical and Electronics Engineers. The communication interface 23 communicates with the terminal apparatus 30. The communication interface 23 receives data to be used for the operations of the information processing apparatus 20, and transmits data obtained by the operations of the information processing apparatus 20.

The functions of the information processing apparatus 20 are realized by execution of a program according to the present embodiment by a processor serving as the controller 21. That is, the functions of the information processing apparatus 20 are realized by software. The program causes a computer to execute the operations of the information processing apparatus 20, thereby causing the computer to function as the information processing apparatus 20. That is, the computer executes the operations of the information processing apparatus 20 in accordance with the program to thereby function as the information processing apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the information processing apparatus 20 may be realized by a programmable circuit or a dedicated circuit serving as the controller 21. That is, some or all of the functions of the information processing apparatus 20 may be realized by hardware.

The vehicle database 24, the work item database 25, and the location database 26 are built in the memory 22 in the present embodiment, but may be built in external storage to which the communication interface 23 can connect. Examples of data stored in the vehicle database 24, the work item database 25, and the location database 26 are illustrated in FIG. 3 through FIG. 5, respectively.

In the example illustrated in FIG. 3, the vehicle database 24 contains records with at least a vehicle ID field, a part ID field, an equipment start date field, and an equipment end date field as data on parts with which a plurality of vehicles is equipped. The term "ID" is an abbreviation of identifier. The vehicle ID field of each record records the identifier of the corresponding vehicle. The part ID field of each record contains the identifier of the part with which the vehicle identified in the corresponding vehicle ID field is equipped. The equipment start date field of each record records the date when the part identified in the corresponding part ID field was installed in the vehicle identified in the corresponding vehicle ID field. The equipment end date field of each record records the date when the part identified in the corresponding part ID field was removed from the vehicle identified in the corresponding vehicle ID field.

In the example illustrated in FIG. 4, the work item database 25 contains records with at least a work item ID field and a fee field as data on fees for a plurality of work items. The work item ID field of each record contains the identifier of the corresponding work item. The fee field of each record records the fee set for the work item identified in the corresponding work item ID field.

In the example illustrated in FIG. 5, the location database 26 contains records with at least a location ID field, a work item ID field, and an address field as data on work items that can be performed at a plurality of locations. The location ID field of each record records the identifier of the corresponding location. The work item ID field of each record contains the identifier of the work item that can be performed at the location identified in the corresponding location ID field. The address field of each record contains the address where the location identified in the corresponding location ID field is located.

Operations of the information processing apparatus 20 according to the present embodiment will be described with reference to FIG. 6. The operations illustrated in FIG. 6 correspond to an information processing method according to the present embodiment.

When the controller 21 receives a request for customization of the vehicle 12 in step S1, it acquires the identifier of the vehicle 12 in step S2. Specifically, when the user 11 logs into the website of the business that operates the information processing apparatus 20 and requests customization of the vehicle 12, such as ordering parts for customizing the vehicle 12, the controller 21 receives the request for customization from the terminal apparatus 30 via the communication interface 23. The controller 21 then acquires the vehicle ID corresponding to the user ID used by the user 11 at the time of login as the vehicle 12 identifier. The vehicle ID is stored in the memory 22 or in external storage to which the communication interface 23 can be connected, tied to the user ID in advance. Alternatively, the vehicle ID may be entered into the site by the user 11, and the controller 21 may acquire the entered vehicle ID from the terminal apparatus 30 via the communication interface 23 as an identifier for the vehicle 12.

In step S3, the controller 21 identifies one or more parts with which the vehicle 12 is already equipped by searching the vehicle database 24 using the identifier acquired in step S2 as a key. In step S4, the controller 21 determines the work items for customization according to one or more parts identified in step S3. The controller 21 notifies the terminal apparatus 30 of the determined work items via the communication interface 23. The terminal apparatus 30, for example, displays its work items for the user 11.

As an example, when the controller 21 receives a request to change the color of the body of the vehicle 12, it searches the vehicle database 24 to see if the vehicle 12 has a peelable coating as disclosed in Patent Literature (PTL) 2. In the example illustrated in FIG. 3, a search of the vehicle database 24 using the vehicle ID as a key returns a list of part IDs corresponding to the vehicle ID as a search result. The controller 21 automatically determines if the vehicle 12 has a paint that can be removed by checking whether this list includes the part ID of the paint that can be removed. If there is no paint on the vehicle 12 that can be removed, the controller 21 automatically determines that the work item for customization is simply to apply a new coat of paint, i.e., to apply a new coat of paint over the current paint. On the other hand, if the vehicle 12 is already coated with paint that can be removed, the controller 21 automatically determines that the work item for customization is to remove the paint and then apply a new coating.

As another example, when the controller 21 receives a request to add driver assistance functions such as BSM, LDWS, or PCS to the vehicle 12, it checks whether an electrical part such as a wiring harness is installed in the vehicle 12 by searching the vehicle database 24. The term "BSM" is an abbreviation of blind spot monitor. The term "LDWS" is an abbreviation of lane departure warning system. The term "PCS" is an abbreviation of pre-crash safety system or pre-collision system. In the example illustrated in FIG. 3, a search of the vehicle database 24 using the vehicle ID as a key returns a list of part IDs corresponding to the vehicle ID as a search result. The controller 21 automatically determines whether an electrical part is installed in the vehicle 12 by checking whether the list includes the part ID of the electrical part. The controller 21 may automatically determine what type of electrical components are installed in the vehicle 12 by referring to the part IDs of the electrical components in the list. If no electrical part is installed in the vehicle 12, the controller 21 automatically determines that, as a work item for customization, a new electrical part should be installed and then electronic devices such as sensors required for the driver assistance functions to be added. If an electrical part for the driver assistance functions to be added are already installed in the vehicle 12, the controller 21 automatically determines that the work item for customization is simply to install an electronic device such as a sensor. On the other hand, if an electrical part for another function is already installed in the vehicle 12, the controller 21 automatically determines that the electrical part should be temporarily removed and re-installed along with an additional electrical part, and then an electronic device such as a sensor should be installed as a work item for customization.

In the present embodiment, the controller 21 determines, in step S4, the work item for customization according to the number of years of usage or the replacement history of the one or more parts identified in step S3 upon recognizing that the same type of part as a part with which the vehicle 12 is to be equipped for the customization is included in the one or more identified parts.

As an example, when the controller 21 receives a request to change the color or decoration of the headlamp 13 of the vehicle 12, it searches the vehicle database 24 to see if the extension 18, as illustrated in FIG. 2, is installed on the vehicle 12. In other words, the controller 21 checks whether the one or more parts identified in step S3 includes the extension 18 as a part of the same type as the part to be equipped in the vehicle 12 for customization. In the example illustrated in FIG. 3, a search of the vehicle database 24 using the vehicle ID as a key returns a list of part IDs corresponding to the vehicle ID as a search result. The controller 21 automatically determines whether the extension 18 is attached to the vehicle 12 by checking whether the part ID of the extension 18 is included in this list. If the extension is not installed on the vehicle 12, the controller 21 automatically determines that the work item for customization is simply to install a new extension. On the other hand, if the extension 18 is already installed in the vehicle 12, the controller 21 checks the number of years of usage or the replacement history of the headlamp 13 by searching the vehicle database 24. The controller 21 then determines the work item for the customization by selecting either one of replacing only the extension 18, and replacing the extension 18 together with the entire outer lens 14 or replacing the headlamp 13 itself, according to the number of years of usage or the replacement history of the headlamp 13. In the example illustrated in FIG. 3, a search of the vehicle database 24 using the combination of vehicle ID and part ID as a key returns, as search results, the equipment start and end dates corresponding to the combination of vehicle ID and part ID. The controller 21 automatically determines the number of years of usage of the headlamp 13 have been in use by calculating the number of years elapsed since the equipment start date of the headlamp 13. The controller 21 automatically determines if the headlamp 13 have been replaced by checking to see if there is another headlamp that was equipped prior to the equipment start date of the headlamp 13. The controller 21 automatically determines if the outer lens 14 has been replaced by checking to see if there is another outer lens that was equipped prior to the equipment start date of the outer lens 14. The controller 21 automatically determines if the extension 18 has been replaced by checking to see if there is another extension that was equipped prior to the equipment start date of the extension 18. For example, if the vehicle 12 is new, or if the extension 18 has already been replaced with the entire outer lens 14, or if the headlamp 13 itself has been replaced, the controller 21 will automatically determine that only the extension 18 is to be replaced as a work item for customization. On the other hand, if the vehicle 12 is more than several years old after delivery, or the vehicle 12 is a used vehicle, or if only the extension 18 has been added or replaced, the controller 21 automatically determines, as the work item for customization, replacing the extension 18 together with the entire outer lens 14 or replacing the headlamp 13 itself. In addition to the number of years of usage or the replacement history, the controller 21 may determine the work items for the customization based on the degree of deterioration, cumulative lighting hours, or presence of scratches.

In step S5, the controller 21 searches the work item database 25 to further determine the fee for the customization. The controller 21 notifies the terminal apparatus 30 of the determined fee via the communication interface 23. The terminal apparatus 30, for example, displays the fee to the user 11.

As an example, if the controller 21 decides to replace only the extension 18, it searches the work item database 25 and automatically calculates the fee for the customization to include the price of the work to replace the extension 18 only. In the example illustrated in FIG. 4, a search of the work item database 25 using the work item ID as a key returns the fee corresponding to the work item ID as a search result. The controller 21 applies this fee to the customization charge.

In step S6, the controller 21 searches the location database 26 to further determine the location where the customization is to be performed. The controller 21 notifies the terminal apparatus 30 of the determined location via the communication interface 23. The terminal apparatus 30, for example, displays its location to the user 11.

As an example, when the controller 21 decides to replace only the extension 18, it searches the location database 26 and automatically selects the best location among locations where the work to replace only the extension 18 can be performed. In the example illustrated in FIG. 5, a search of the work item database 25 using the work item ID as a key returns a list of location IDs and addresses corresponding to the work item ID as search results. The controller 21 selects from this list, for example, the location closest to the home address of the user 11 as the best location. Replacing only the extension 18 is a special task compared to replacing the extension 18 together with the entire outer lens 14 or replacing the headlamp 13 itself. Therefore, the work cannot be performed at the automobile dealer's location and may have to be performed at a specialized location. The present embodiment can be used to address such cases.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A method comprising:
   upon receiving a request for customization of a vehicle, automatically acquiring an identifier of the vehicle from a memory storing the identifier of the vehicle;
   automatically identifying one or more parts with which the vehicle is already equipped by searching a vehicle database that stores data on parts with which a plurality of vehicles is equipped using the acquired identifier as a key;
   upon receiving a request to change color or decoration of a headlamp of the vehicle as the request for the customization and recognizing that an extension is included in the one or more parts as a same type of part as a part with which the vehicle is to be equipped for the customization, automatically determining a work item for the customization by selecting one of replacing only the extension, replacing the extension together with an entire outer lens, or replacing the headlamp itself, based on a number of years of usage of the headlamp or a replacement history of the headlamp; and
   customizing the vehicle by performing the selected one of replacing only the extension, replacing the extension together with the entire outer lens, or replacing the headlamp itself.

2. The method according to claim 1, further comprising:
   searching a work item database that stores data on fees for a plurality of work items to further automatically determine a fee for the customization.

3. The method according to claim 1, further comprising:
   searching a location database that stores data on work items that can be performed at a plurality of locations to further automatically determine a location at which the customization is to be performed.

4. The method according to claim 1, wherein selecting the one of replacing only the extension, replacing the extension together with the entire outer lens, or replacing the headlamp itself is performed based further on a degree of deterioration of the headlamp, cumulative lighting hours of the headlamp, or presence of scratches of the headlamp.

5. The method according to claim 3, further comprising:
   upon selecting replacing only the extension, selecting a location closest to a home address of a user who has sent the request for customization of the vehicle, as the location at which the customization is to be performed.

6. The method according to claim 1, further comprising:
   upon receiving a request to change color of a body of the vehicle as the request for the customization, automatically determining whether the vehicle has a paint that can be removed;
   in response to determining that the vehicle has no paint that can be removed, automatically determining that the work item for the customization is to apply a new coat of paint over a current paint; and
   in response to determining that the vehicle is already coated with the paint that can be removed, automatically determining that the work item for the customization is to remove the current paint and then apply the new coat of paint.

7. The method according to claim 1, further comprising:
   upon receiving a request to add a driver assistance function to the vehicle as the request for the customization, automatically determine what type of electrical parts are installed in the vehicle;
   in response to determining that no electrical part is installed in the vehicle, automatically determining that the work item for the customization is to install an electrical part and a sensor required for the driver assistance function;
   in response to determining that the electrical part required for the driver assistance function is already installed in the vehicle, automatically determining that the work item for the customization is to install the sensor; and
   in response to determining that another electrical part required for another function is already installed in the vehicle, automatically determining that the work item for the customization is to temporarily remove the another electrical part, re-install the another electrical part along with the electrical part required for the driver assistance function, and install the sensor.

* * * * *